United States Patent [19]

Iwasaki et al.

[11] 4,231,047

[45] Oct. 28, 1980

[54] INK-JET PRINTING METHOD AND DEVICE THEREFOR

[75] Inventors: Kyuhachiro Iwasaki, Fujisawa; Yutaka Kodama, Tokyo; Koichiro Jinnai, Kawasaki; Masanori Horike, Yokohama, all of Japan

[73] Assignee: Ricoh Co., Ltd., Tokyo, Japan

[21] Appl. No.: 43,638

[22] Filed: May 30, 1979

[30] Foreign Application Priority Data

Jul. 6, 1978 [JP] Japan ................................ 53-68527

[51] Int. Cl.$^3$ ............................................ G01D 15/18

[52] U.S. Cl. ...................................................... 346/75

[58] Field of Search .......................................... 346/75

[56] References Cited

U.S. PATENT DOCUMENTS 3,334,351 8/1967 Stauffer ................................ 346/75

3,979,756 9/1976 Helinski ............................ 346/75 X

*Primary Examiner*—Joseph W. Hartary

*Attorney, Agent, or Firm*—Burgess, Ryan and Wayne

[57] ABSTRACT

A first ultrasonic transducer is normally energized so that the ink jet normally emerging through a nozzle of an ink manifold containing the pressurized ink may break into an ink drop within a charge electrode and the charged ink drop may be deflected by a pair of deflection electrodes so as to travel toward a gutter. In response to the ink-placement signal a second ultrasonic transducer is de-energized when it has been energized in phase or in opposite phase with the first ultrasonic transducer when the second ultrasonic transducer has been de-energized so that the formation of each ink drop may occur outside of the charge electrode and the uncharged ink drop may travel to strike against a recording medium.

8 Claims, 10 Drawing Figures

FIG. 3

| MODE | ULTRASONIC TRANSDUCERS | EXCITATION PHASE | AMPLITUDE | INK DROPS | TARGETS |
|---|---|---|---|---|---|
| 1 | 1 | IN PHASE | II | CHARGED | GUTTER |
| | 1<br>2 | IN PHASE<br>IN PHASE | III | NOT CHARGED | RECORDING PAPER |
| 2 | 1 | IN PHASE | II | CHARGED | GUTTER |
| | 1<br>2 | IN PHASE<br>OPPOSITE PHASE | I | NOT CHARGED | RECORDING PAPER |
| 3 | 1 | IN PHASE | I | NOT CHARGED | GUTTER |
| | 1<br>2 | IN PHASE<br>IN PHASE | II | CHARGED | RECORDING PAPER |
| 4 | 1 | IN PHASE | III | NOT CHARGED | GUTTER |
| | 1<br>2 | IN PHASE<br>OPPOSITE PHASE | II | CHARGED | RECORDING PAPER |
| 5 | 1<br>2 | IN PHASE<br>OPPOSITE PHASE | II | CHARGED | GUTTER |
| | 1 | IN PHASE | III | NOT CHARGED | RECORDING PAPER |
| 6 | 1<br>2 | IN PHASE<br>OPPOSITE PHASE | II | CHARGED | GUTTER |
| | 1<br>2 | IN PHASE<br>IN PHASE | III | NOT CHARGED | RECORDING PAPER |
| 7 | 1<br>2 | IN PHASE<br>IN PHASE | II | CHARGED | GUTTER |
| | 1 | IN PHASE | I | NOT CHARGED | RECORDING PAPER |
| 8 | 1<br>2 | IN PHASE<br>IN PHASE | II | CHARGED | GUTTER |
| | 1<br>2 | IN PHASE<br>OPPOSITE PHASE | I | NOT CHARGED | RECORDING PAPER |
| 9 | 1<br>2 | IN PHASE<br>OPPOSITE PHASE | I | NOT CHARGED | GUTTER |
| | 1 | IN PHASE | II | CHARGED | RECORDING PAPER |
| 10 | 1<br>2 | IN PHASE<br>OPPOSITE PHASE | I | NOT CHARGED | GUTTER |
| | 1<br>2 | IN PHASE<br>IN PHASE | II | CHARGED | RECORDING PAPER |
| 11 | 1<br>2 | IN PHASE<br>IN PHASE | III | NOT CHARGED | GUTTER |
| | 1 | IN PHASE | II | CHARGED | RECORDING PAPER |
| 12 | 1<br>2 | IN PHASE<br>IN PHASE | III | NOT CHARGED | GUTTER |
| | 1<br>2 | IN PHASE<br>OPPOSITE PHASE | II | CHARGED | RECORDING PAPER |

FIG. 9
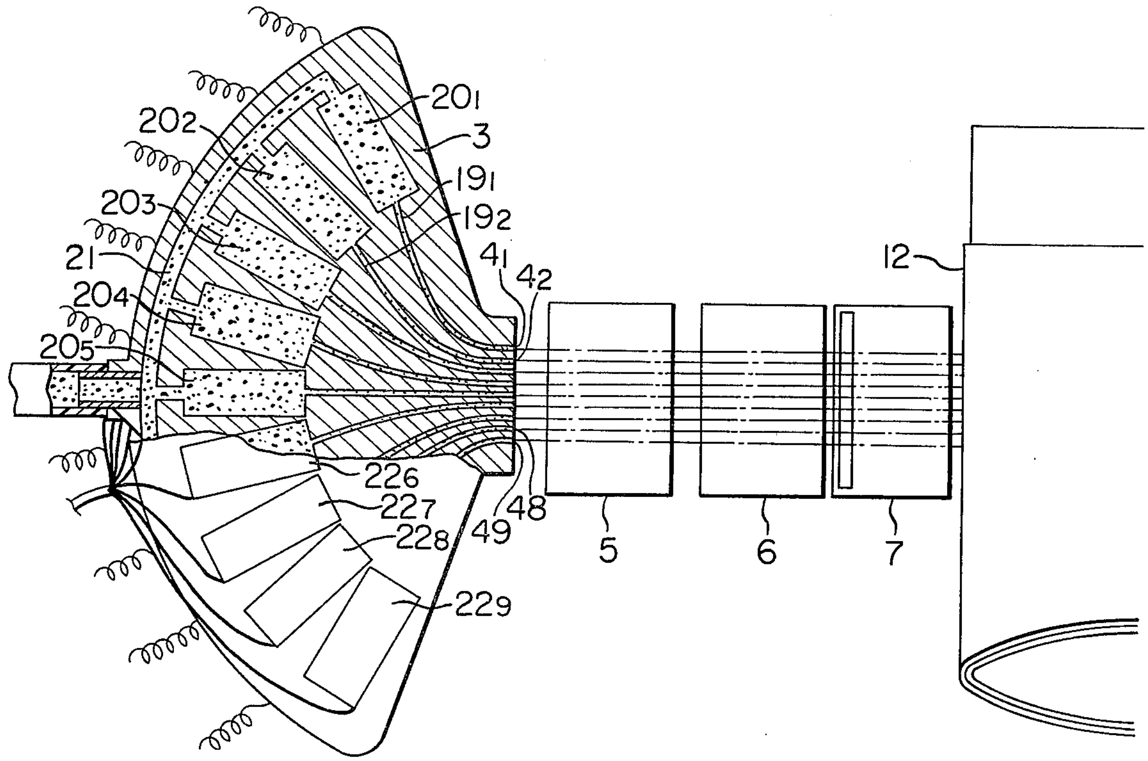
FIG. 10
(a)
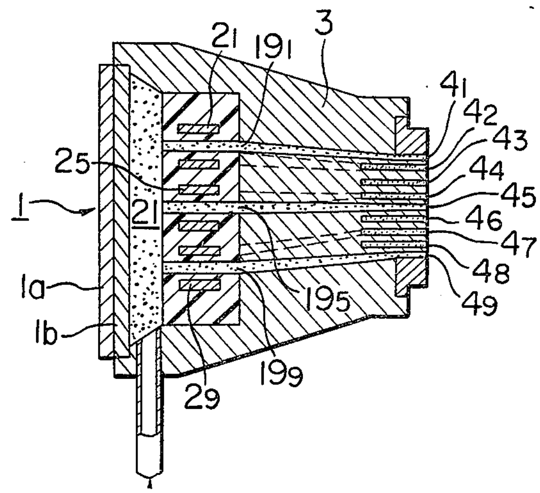
(b)
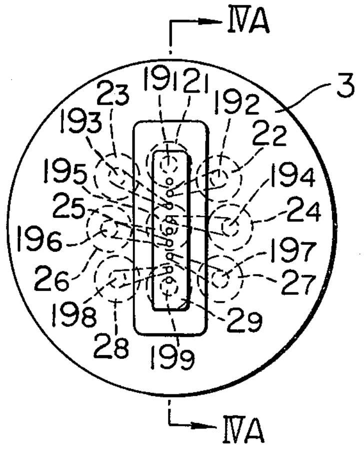

INK-JET PRINTING METHOD AND DEVICE THEREFOR

BACKGROUND OF THE INVENTION

The present invention relates to an ink-jet printing method and an ink-jet printer of the type wherein the ink emerging through a nozzle of an ink drop generator breaks into a stream of ink drops which are selectively charged or not charged so as to steer them to a gutter or to a recording medium.

A typical example of the prior art ink-jet printing methods and ink-jet printers is such that ultrasonic vibration is transmitted to the pressurized ink confined in an ink manifold of an ink drop generator so that the ink jet emerging through a nozzle of the ink drop generator may break into a stream of ink drops equally spaced apart from each other. A charge electrode is disposed at a position where the ink jet breaks into drops and is charged with a charging voltage in response to the character or image forming signal in such a way that each ink drop may be charged independently of each other to a different level. The charged ink drops are deflected by a pair of deflection plates so that the characters or images of one line may be printed or recorded in one main scanning step. (For further reference, see Japanese Laid-Open Patent No. 50-60131). During the main scanning in for instance the transverse direction, one-line auxiliary scanning in the longitudinal direction is repeated while the level of the voltage applied to the charge electrode is varied. Therefore the formation of each ink drop must be precisely timed with the application of the voltage pulse to the charge electrode, but it is extremely difficult to attain the correct synchronization between the formation of each ink drop and the application of the voltage pulse to the charge electrode. Furthermore the printed image or character is caused to incline.

In the case of the ink-on-demand type ink-jet printing methods and printers, in response to the character or image forming signal or the ink-placement signal a voltage pulse is applied to an ultrasonic transducer mounted on an ink drop generator and one dot is placed on a recording paper. Therefore the synchronization between the formation of an ink drop and the application of a voltage pulse to the charge electrode will not present any serious problems. Furthermore the inclination of the printed character or image may be eliminated.

In the deflection type ink-jet printing methods and ink-jet printers, the voltage applied to the charge electrode is so controlled that the repetitive auxiliary or complementary scanning in the longitudinal direction may be eliminated and consequently the timing for applying the voltage to the charge electrode may have more degrees of freedom, but while one line is printed in one main scanning in the prior art printing method, a plurality of main scannings must be made (for instance, nine scannings when one line consists of nine picture elements). When a plurality of nozzles are disposed in an array, one line may be printed within one main scanning so that the printing speed may be increased. However the electrical connections, maintenance, inspection and especially cleaning of charge electrodes which are disposed for respective nozzles would become extremely difficult. For instance, in the case of the deflection type ink-jet printers, ink dribbling occurs because of the time lag in pressure transmission when the print head is energized or de-energized so that the contamination of the charge electrode and the deflection electrodes results. When a large number of charge electrodes are densely disposed, their cleaning becomes extremely difficult. The contamination of the charge and deflection electrodes results in mischarging and misdeflection of ink drops, thus resulting in drop misplacements and the contamination of the printing head and the recording medium.

SUMMARY OF THE INVENTION

Accordingly one of the objects of the present invention is to provide an ink-jet printing method and an ink-jet printer which is simple in construction and may increase the printing speed.

Another object of the present invention is to provide an ink-jet printing method and an ink-jet printer therefor which may employ one common charge electrode and one pair of deflection electrodes for an ink drop generator with a plurality of nozzles so that cleaning of the print head may be much facilitated.

BRIEF DESCRIPTION OF THE DRAWINGS

FIG. 3 shows the modes of operation thereof;

FIG. 9 is a top view, partly broken, of a second embodiment of the present invention;

FIG. 10(*a*) is a longitudinal sectional view of a modification of the second embodiment; and FIG. 10(*b*) is a front view thereof.

DESCRIPTION OF THE PREFERRED EMBODIMENTS

Figure 1:
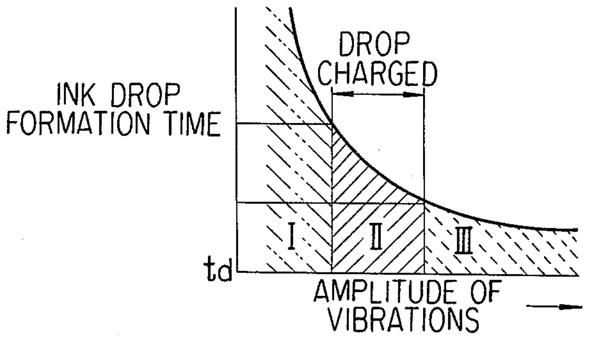
FIG. 1 is a graph showing the relationship between the amplitude of vibration applied to an ink drop generator and the ink drop formation time; that is, a time interval from the time when the ink jet emerges from a nozzle of an ink drop generator to the time when an ink drop is formed.

The underlying principle of the present invention will be first described. The ink under pressure is supplied to an ink jet head or an ink drop generator and an ultrasonic transducer vibrates the pressurized ink confined in an ink manifold so that the ink jet may emerge through a nozzle. The ink drop formation time td (that is, a time interval from the time when the ink jet emerges from the nozzle to the time when the ink jet breaks up into drops) varies in response to the amplitude of vibration in pressure of the ink in the manifold as shown in FIG. 1. Therefore a charge electrode is located at a position immediately before the point at which the ink jet breaks into droplets and is impressed with a predetermined level of charging voltage or with charging pulses with a predetermined pulse duration in synchronism with the time at which each ink drop is formed. Then the ink drops are charged in the second region II in FIG. 1, but they are not charged in the first and third regions I and III. Therefore it follows that when the charged and uncharged ink drops pass between a pair of deflection electrodes the charged ink drops may be steered to a recording paper while the uncharged ink drops may be steered toward a gutter, and vice versa. That is, when the amplitude is changed from III to II or from II to III or from I to II or from II to I in response to the character forming signal or ink-placement signal, all the points on the recording paper may be addressed; that is, any point may be either marked with an ink droplet or left blank.

According to the present invention, the change of the amplitude is made in a following manner. That is, a first ultrasonic transducer is normally energized so that the pressurized ink may vibrate at a predetermined frequency while a second ultrasonic transducer is selectively de-energized or energized in phase or in opposite phase with the first ultrasonic transducer in response to the character forming signals or ink-placement signals.

Figure 2:
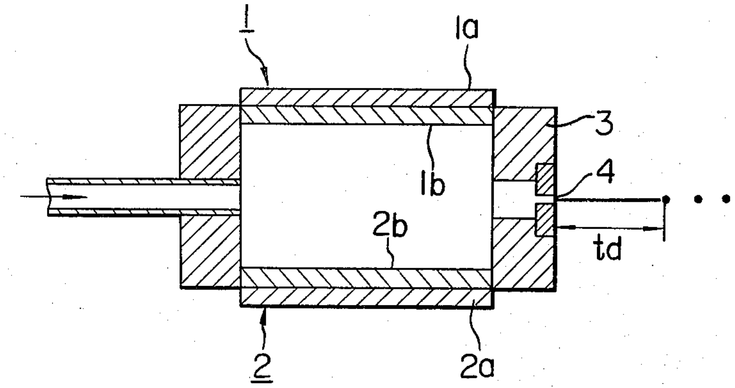
FIG. 2 is a longitudinal sectional view of an ink drop generator used in the present invention.

In FIG. 2 is shown one example of the construction of an ink jet head or an ink drop generator comprising a first ultrasonic transducer 1 consisting of an electrostrictive element 1*a* and a diaphragm 1*b*, a second ultrasonic transducer 2 consisting of an electrostrictive element 2*a* and a diaphragm 2*b* and a hollow cylindrical body or ink manifold 3 with a nozzle 4.

The ink jet head shown in FIG. 2 may be operated in the modes shown in FIG. 3. That is, in the first mode 1 the first ultrasonic transducer 1 is normally energized so that the pressurized ink may vibrate at an amplitude in the second region II so that the ink drops may be charged and steered toward the gutter, but in response to the character formation signal or ink-placement signal the second ultrasonic transucer 2 is energized in phase with the first ultrasonic transducer 1 so that the pressurized ink may vibrate at an amplitude in the region III and consequently may not be charged so as to strike against the recording paper.

In the mode 5 the first ultrasonic transducer 1 is normally energized while the second ultrasonic transducer 2 is energized in opposite phase so that the pressurized ink may be vibrated at an amplitude within the second region II and consequently charged so as to travel toward the gutter, but in response to the ink-placement signal the second ultrasonic transducer 2 is de-energized so that the pressurized ink may vibrate at an amplitude in the third region III and consequently the uncharged ink drop may strike against the recording paper.

The other modes 2, 3, 4 and 6–12 of operation of the ink jet or print head or the ink drop generator will be apparent from the table shown in FIG. 3.

So far the second ultrasonic transducer 2 has been described as being energized in phase or in opposite phase with the first transducer 1 or being de-energized, but it will be understood that the amplitude of the second ultrasonic transducer may be continuously or stepwise varied with respect to that of the first ultrasonic transducer 1.

Figure 4:
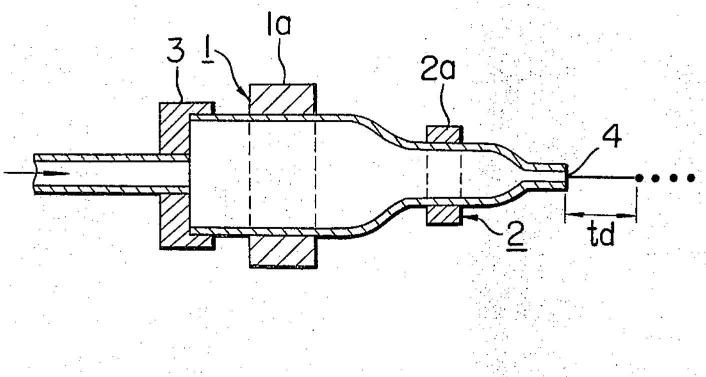
FIG. 4 is a longitudinal sectional view of another ink drop generator used in the present invention.

In FIG. 4 is shown another example of the construction of an ink jet head or an ink drop generator in accordance with the present invention. The first and second ultrasonic transducers 1 and 2 are of a ring shape and are mounted on the body or ink manifold in spaced-apart relationship in the direction in which the pressurized ink flows. In this construction, however, there inevitably exists some time lag before the ultrasonic waves generated by the first ultrasonic transducer 1 reach the second ultrasonic transducer 2 so that the phase of the frequency of the second ultrasonic transducer 2 must be controlled accordingly.

Figure 5:
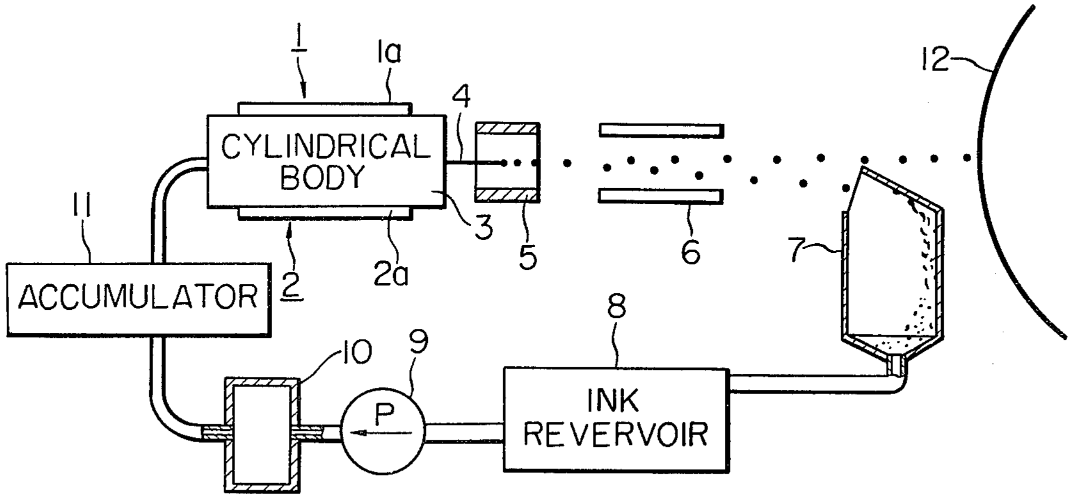
FIG. 5 is a schematic side view of a first embodiment of the present invention.

In FIG. 5 is shown a first embodiment of an ink-jet printer in accordance with the present invention which is equipped with the ink jet head or the ink drop generator shown in FIG. 2 and is operated in one of the modes shown in FIG. 3. The first embodiment includes an excitation control circuit shown in FIG. 6 so as to control the first and second ultrasonic transducers 1 and 2 as will be described in detail below with reference to the signal waveforms shown in FIG. 8.

Referring particularly to FIG. 5, a charge electrode is located at the position at which the ink jet emerges through the nozzle 4 of the ink manifold or ink drop generator breaks into drops only when the first ultrasonic transducer 1 is emergized and is normally charged with a voltage supplied from a constant voltage source (not shown). A pair of deflection electrodes 6 are disposed in the traveling path of the ink drops and a deflection voltage from a constant voltage source (not shown) are normally supplied to the deflection electrode 6. A gutter 7 is disposed at such a position that the ink drops which are charged by the charge electrode 5 and pass through the deflection electrodes 6 may be trapped. The ink trapped in the gutter is returned to an ink reservoir 8. The ink from the reservoir 8 is pressurized by a pump 9 and forced to flow through a filter 10 into an accumulator 11 and then into the ink manifold 3.

When the second ultrasonic transducer 2 is energized in phase with the first ultrasonic transducer 1, the ink jet emerges through the nozzle 4 and breaks into drops before it reaches the charge electrode 5 so that the ink drops are not charged. As a result the uncharged ink drop travels straight and strikes against a recording paper 12.

The recording paper 12 is wrapped around a drum which is rotated in the first or main scanning direction while a carriage upon which are mounted the ink manifold 3, the charge electrode 5, the deflection electrodes 6, the gutter 7, the ink reservoir 8, the pump 9, the filter 10 and the accumulator 11 is displaced in the second or auxiliary scanning direction which is in parallel with the axis of the drum at a rate of a distance equal to one picture element per revolution of the drum 1.

Figure 6:
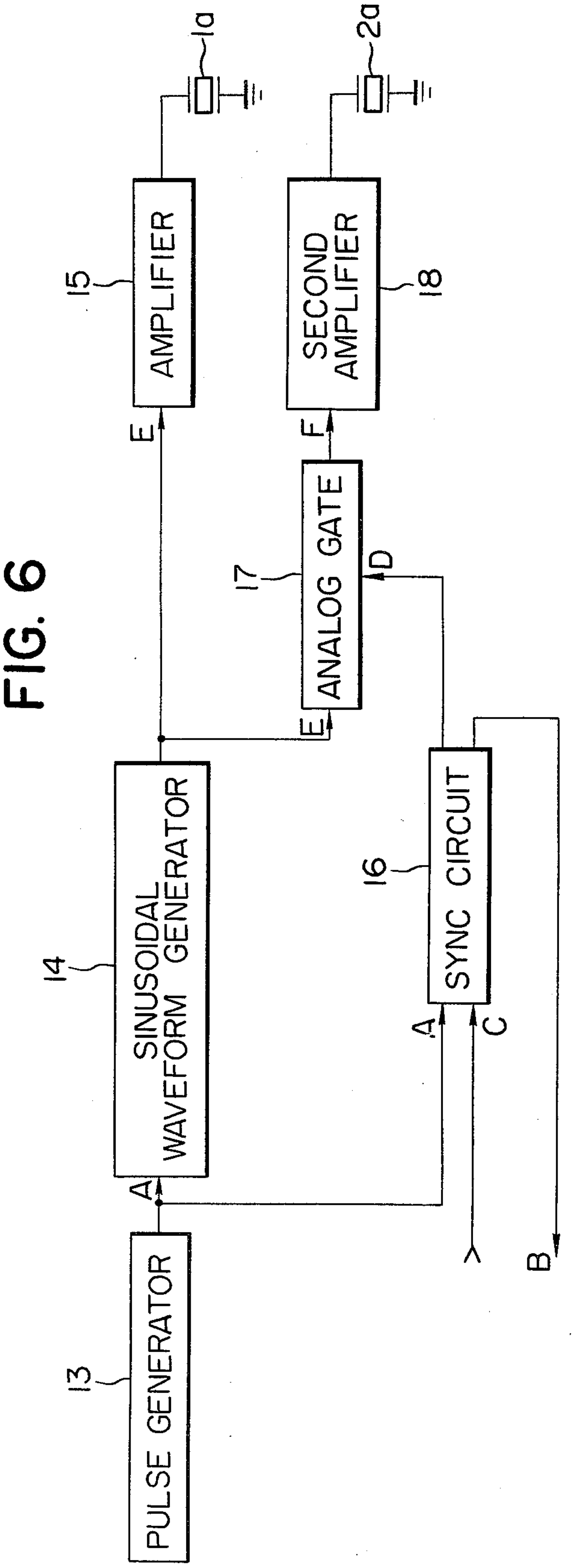
FIG. 6 is a block diagram of an excitation control circuit.

Next referring to FIG. 6, the excitation control circuit will be described. The control circuit comprises a pulse generator 13 for generating pulses A (See FIG. 8), a sinusoidal waveform generator 14 for generating an exciting signal E, an amplifier 15 for amplifying the output from the sinusoidal waveform generator 14 to a suitable level, a sync circuit 16 for generating the gate-on signal D in response to the sync pulse B, an analog gate 17 which is enabled in response to the gate-on signal D so as to pass the exciting signal E as shown at F in FIG. 8, and a second amplifier 18 for amplifying the output from the analog gate 17 and delivering it to the second ultrasonic transducer 2.

Figure 8:
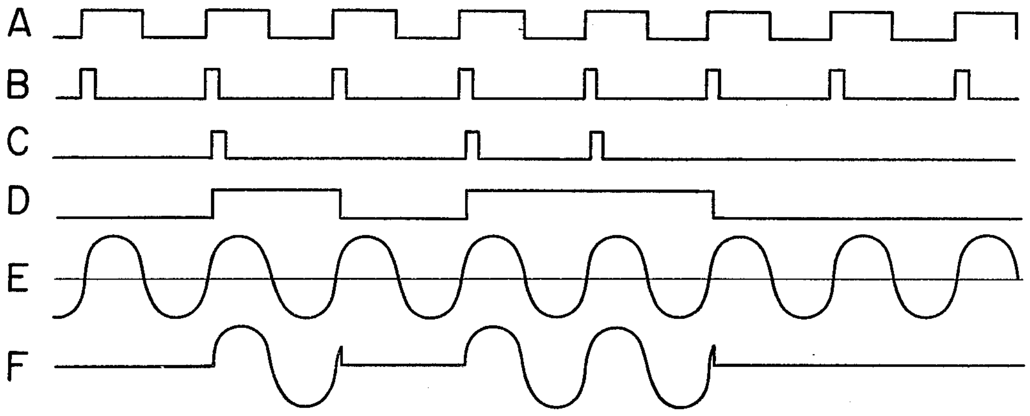
FIG. 8 shows the signal waveforms used for the explanation of the mode of operation of the excitation control circuit shown in FIG. 6.
Figure 7:
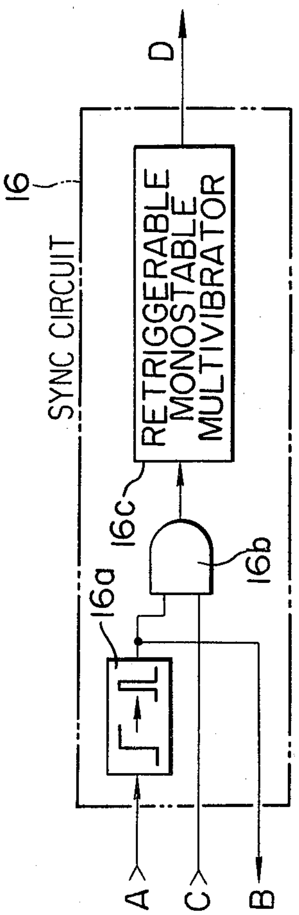
FIG. 7 is a block diagram of a sync circuit shown in FIG. 6.

As shown in FIG. 7, the sync circuit 16 comprises a positive edge detection circuit 16*a* for detecting the positive edge of the pulse A so as to generate the sync pulse B with a relatively short pulse duration, an AND gate 16*b* which delivers the high level output signal "1" when it simultaneously receives the sync pulse B and the ink-placement signal C, and a re-triggerable monostable multivibrator 16*c* which is triggered in response to the positive edge of the output from the AND gate 16*b* so as to deliver the high-level output "1" as shown at D in FIG. 8 for a predetermined time interval (which is almost equal to one pulse spacing of the pulses A) and is capable of further delivering the "1" output D for a predetermined time interval from the time when the multivibrator 16c receives another trigger signal even when it is delivering the "1" output D in response to the previous trigger pulse.

Referring further to FIG. 8, the mode of operation of the excitation control circuit will be described in more detail below. When the control circuit is energized and the voltages are impressed at the charge electrode 5 and the deflection electrodes 6, the sinusoidal waveform generator 14 generates the exciting signal E which is amplified by the first amplifier 15 and delivered to the electrostrictive element 1a of the first ultrasonic transducer 1. As a result, the ink jet emerges from the nozzle 4 of the ink manifold 3 (See FIG. 5) and breaks into an ink drop. The ink drop formation is so timed that the drop is charged and deflected by the deflection electrodes 6 toward the gutter 7 as described elsewhere.

Meanwhile in synchronism with the pulses A, the sync circuit 16 generates one sync pulse B per one ink drop and transmits it to a character forming signal generator (not shown). The sync pulse B not only represents that ink-drop-placement is possible but also is used to time the ink-placement signal to be received. When the ink-placement signal is received in response to the sync pulse B, AND gate 16b delivers the output to the monostable multivibrator 16c so that the latter delivers the gate-on or "1" signal D as described above. In response to the "1" gate-on signal D, the analog gate 17 is turned on so that the exciting signal E is delivered to the second amplifier 18 and consequently the second electrostrictive element 2a of the second ultrasonic transducer 2 is energized. The synchronizing signal impressed to the second ultrasonic transducer 2 is in phase with that impressed to the first ultrasonic transducer 1 so that the pressurized ink in the ink manifold 3 vibrates at an amplitude in the region III and consequently the ink jet emerging through the nozzle 4 breaks into an ink drop outside of the charge electrode 5. Therefore the ink drop is not charged and travels straight so as to strike against the recording paper 12.

When the sync circuit 16 is receiving the ink-placement signal pulse C at a rate of one per one cycle of the exciting signal E, the vibrator 16 continuously delivers the high-level "1" output D so that both the first and second ultrasonic transducers 1 and 2 are energized in the same phase and consequently the ink drops are sequentially placed on the recording paper 12. However when the ink-placement signal C disappears, the output D from the monostable multivibrator 16c drops to a low level "0" almost one cycle of the exciting signal E after the last ink-placement signal pulse C so that the analog gate 17 is turned off and sensequently no exciting signal is applied to the second ultrasonic transducer 2. As a result, the next ink drop is charged and trapped in the gutter as described elsewhere.

In summary, the first embodiment of the present invention may eliminate such a timing control that a charge voltage pulse is applied in synchronism with a specific phase of the exciting signal E. Furthermore the timing for energizing the second ultrasonic transducer may be controlled in a simple manner. Moreover misregistration or inclination of a recorded character or pattern may be avoided. In addition, since the pressurized ink is vibrated at ultrasonic frequencies, the ink clogging the nozzle during the non-operative mode of the ink-jet printer may be immediately expelled out of the nozzle.

Second Embodiment, FIGS. 9 and 10

Referring to FIGS. 9 and 10, a base member 3 of a print head or ink drop generator has 9 nozzles $\mathbf{4}_1$–$\mathbf{4}_9$ which are communicated with respective ink manifolds $\mathbf{20}_1$–$\mathbf{20}_9$ through ink passages $\mathbf{19}_1$–$\mathbf{19}_9$. First ultrasonic transducers $\mathbf{22}_1$–$\mathbf{22}_9$ ($\mathbf{22}_1$–$\mathbf{22}_5$ are not shown) and second ultrasonic transducers (not shown) are mounted on the top and bottom surfaces of the base member 3 in such a way that each pair of the first and second ultrasonic transducers sandwiches the ink manifold 20. The charge electrode 5, the deflection electrodes 6 and the gutter 7 are common to all ink droplets emerging from the nine nozzles $\mathbf{4}_1$–$\mathbf{4}_9$.

In operation the first ultrasonic transducers $\mathbf{22}_1$–$\mathbf{22}_9$ are energized in the same phase in response to the exciting signal E (See FIG. 8). Each of the second ultrasonic transducers is connected to the sync circuit 16, the AND gate 17 and the amplifier 18 (See FIG. 6) so that the second ultrasonic transducers may be energized independently of each other in response to the ink placement signals they receive. In like manner, the first ultrasonic transducers 22 may be so designed and constructed that they may be energized independently of each other.

A multi-nozzle print head may be also constructed with a plurality of single nozzle manifolds or heads of the type shown in FIG. 2 or 4, the common charge electrode 5, the common deflection electrodes 6 and the common gutter 7. The ink manifolds or ink drop generators 3 may be assembled in an array and are connected to respective synchronization frequency control circuits so that they may be energized independently of each other.

In FIGS. 10(*a*) and (*b*) are shown a modification of the multi-nozzle ink drop generator of the present invention wherein one first ultrasonic transducer is common for a plurality of nozzles or ink manifolds. A multi-nozzle ink drop generator is shown as having nine nozzles $\mathbf{4}_1$–$\mathbf{4}_9$ communicated through ink passages $\mathbf{19}_1$–$\mathbf{19}_9$ with a common ink manifold 21. The pressurized ink in the ink manifold 21 is normally vibrated at a first amplitude by a first common ultrasonic transducer 1. Nine ring-shaped second ultrasonic transducers 2 are so disposed as to impress the ultrasonic vibrations to the ink when it flows through respective ink passages $\mathbf{19}_1$–$\mathbf{19}_9$.

This modification is advantageous in that the print head may be made compact in size and the excitation control circuit may be simplified. This modification may also employ a common charge electrode 5, common deflection electrodes 6 and a common gutter 7 as shown in FIG. 9.

In summary, according to the second embodiment of the present invention, a common charge electrode, common deflection electrodes and a common gutter may be used for a multi-nozzle ink drop generator so that electrical interconnections may be considerably simplified. Furthermore cleaning of the print head may be remarkably facilitated. In addition, opposed to a prior art electrostatic deflection type ink-jet printer wherein the auxiliary scanning of one line (in the longitudinal direction) is made while the main scanning is being made in the transverse direction, the misregistration or the inclination of a printed character will not occur. Furthermore, the printing speed may be tremendously increased.

What is claimed is:

1. An ink-jet printing method of the type including the steps of imparting ultrasonic vibrations to the pressurized ink so as to cause the ink jet to emerge through a nozzle and break into a train of ink drops equally spaced apart from each other in time in flight and using a charge electrode and a pair of deflection electrodes in such a way that said ink drops may be selectively steered to travel to strike against a recording medium or to a gutter, CHARACTERIZED by providing an ink drop generator with a first ultrasonic transducer and a second ultrasonic transducer so as to impart the ultrasonic vibrations to the pressurized ink, energizing normally said first ultrasonic transducer in such a way that the formation of each ink drop or breakup of the ink jet into each ink drop may be so timed that each ink drop may be charged or not charged when only said first ultrasonic transducers is energized or when both said first and second ultrasonic transducers are energized simultaneously in response to the ink-placement signal de-energizing or energizing said second ultrasonic transducer, whereby the formation of each ink drop may be so timed as to cause said each ink drop to be not charged or to be charged thereby steering the uncharged or charged ink drop so as to strike against said recording medium.

2. An ink-jet printing method as set forth in claim 1 further characterized by energizing both said first and second ultrasonic transducers simultaneously in phase or in opposite phase with each other in such a way that the ultrasonic vibrations generated by said second ultrasonic transducer may enhance or cancel the ultrasonic vibrations generated by said first ultrasonic transducer and consequently the formation of each ink drop may be so timed that said each ink drop may be charged or not charged, and in response to the ink-placement signal de-energizing said second ultrasonic transducer in such a way that the formation of each ink drop may be so timed that said each ink drop may be not charged or may be charged, whereby the uncharged or charged ink drop may travel so as to strike said recording medium.

3. An ink-jet printing method as set forth in claim 1 further characterized by energizing normally said first ultrasonic transducer in such a way that the formation of each ink drop may be so timed as to cause said each ink drop to be charged or not charged, and in response to the ink-placement signal energizing said second ultrasonic transducer in such a way that the ultrasonic vibration generated by said second ultrasonic transducer may enhance or cancel the ultrasonic vibration generated by said first ultrasonic transducer, thereby steering an ink drop so as to strike against said recording medium.

4. An ink-jet printing method as set forth in claim 1 further characterized by providing said ink drop generator with a plurality of nozzles, providing one first ultrasonic transducer and one second ultrasonic transducer for each of said plurality of nozzles, energizing all the first ultrasonic transducers in the same phase simultaneously while controlling in response to the character forming signal the energization and de-energization of respective second ultrasonic transducers, and providing a common charge electrode and common deflection electrodes for all the ink drops formed through said plurality of nozzles.

5. An ink-jet printing method as set forth in claim 1 further characterized by providing said ink drop generator with a plurality of nozzles, energizing one first ultrasonic transducer so as to impart the ultrasonic vibration to the pressurized ink in a common ink manifold, thereby forcing the ink to flow to respective nozzles, controlling in response to the character forming signal the energization and de-energization of a plurality of second ultrasonic transducers each of which is disposed for each of said nozzles, and providing a common charge electrode and common deflection electrode for the ink drops emerging from said plurality of nozzles.

6. An ink-jet printer characterized by the provision of (a) an ink drop generator comprising
  a plurality of nozzles,
  a common ink manifold,
  a plurality of ink passages communicating said common ink manifold to respective nozzles,
  first one pair of ultrasonic transducers so disposed as to impart the ultrasonic vibration to the pressurized ink in said common ink manifold, and
  a plurality of second ultrasonic transducers each so disposed as to impart the ultrasonic vibration to the ink flowing through each of said plurality of ink passages;

(b) a common charge electrode for charging the ink drops emerging through said plurality of nozzles of said ink drop generator, (c) a pair of deflection electrodes for deflecting the ink drops which have passed through said common charge electrode; and (d) an excitation control circuit which, when said ink-jet printer is energized, keeps said first ultrasonic transducer energized in response to the ink-placement signal selectively de-energizing or energizing said second ultrasonic transducers independently of each other in phase or in opposite phase with said first ultrasonic transducer.

7. An ink-jet printer as set forth in claim 6 further characterized in that a plurality of first ultrasonic transducers are disposed for said plurality of ink passages, respectively, and said synchronization frequency control circuit delivers the exciting voltages in the same phase to said plurality of first ultrasonic transducers.

8. An ink-jet printer as set forth in claim 6 further characterized in that a ultrasonic transducer instead of said first pair of ultrasonic transducer is so mounted on said ink drop generator that it imparts the ultrasonic vibration to the pressurized ink in a common ink manifold.

* * * * *

UNITED STATES PATENT OFFICE

CERTIFICATE OF CORRECTION

Patent No. 4,231,047 Dated October 28, 1980

Inventor(s) Kyuhachiro Iwasaki, et al

It is certified that error appears in the above-identified patent and that said Letters Patent are hereby corrected as shown below:

In FIG. 5, on the title page and in the drawings: "REVERVOIR" should be --RESERVOIR--.

Column 5, line 55: "sensequently" should be --consequently--.

Signed and Sealed this

*Thirty-first* Day of *March 1981*

[SEAL]

*Attest:*

RENE D. TEGTMEYER

*Attesting Officer* *Acting Commissioner of Patents and Trademarks*